(12) United States Patent
Wen et al.

(10) Patent No.: US 11,295,436 B2
(45) Date of Patent: Apr. 5, 2022

(54) VISION INSPECTION SYSTEM AND METHOD OF INSPECTING PARTS

(71) Applicant: TE Connectivity Services GmbH, Schaffhausen (CH)

(72) Inventors: Du Wen, Reading, PA (US); Dale F. Pells, Palmyra, PA (US); Tim Darr, York, PA (US); Sun Kyu Pak, Harrisburg, PA (US); Anthony L. Swann, Lancaster, PA (US); Kevin Eshleman, Manheim, PA (US)

(73) Assignee: TE Connectivity Services GmbH

( * ) Notice: Subject to any disclaimer, the term of this patent is extended or adjusted under 35 U.S.C. 154(b) by 0 days.

(21) Appl. No.: 16/877,000

(22) Filed: May 18, 2020

(65) Prior Publication Data

US 2021/0358112 A1 Nov. 18, 2021

(51) Int. Cl.
*G06K 9/78* (2006.01)
*G06N 20/00* (2019.01)
*H04N 5/247* (2006.01)
*H04N 7/18* (2006.01)
*G06T 7/00* (2017.01)

(52) U.S. Cl.
CPC .............. *G06T 7/0006* (2013.01); *G06K 9/78* (2013.01); *G06N 20/00* (2019.01); *H04N 5/247* (2013.01); *H04N 7/188* (2013.01); *G06K 2209/19* (2013.01); *G06T 2207/20081* (2013.01)

(58) Field of Classification Search
None
See application file for complete search history.

(56) References Cited

U.S. PATENT DOCUMENTS

2014/0346097 A1* 11/2014 Kujacznski ............ G01N 21/89
  209/587
2019/0164270 A1*  5/2019 Wardell ................. G06T 7/0004

\* cited by examiner

*Primary Examiner* — Patricia I Young (57) ABSTRACT

A vision inspection system includes a rotary sorting platform rotated about an axis to rotate parts. The vision inspection system includes an inspection station positioned adjacent the rotary sorting platform including imaging devices to image different sides of the parts. The vision inspection system includes a vision inspection controller receiving images from the imaging devices and processing the images from the imaging devices based on an image analysis model. The vision inspection controller processes the images to determine inspection results for each of the parts. The vision inspection controller has an artificial intelligence learning module operated to update the image analysis model based on the images received from the imaging devices.

19 Claims, 6 Drawing Sheets

FIG. 14

VISION INSPECTION SYSTEM AND METHOD OF INSPECTING PARTS

BACKGROUND OF THE INVENTION

The subject matter herein relates generally to vision inspection systems.

Inspection systems are used for inspecting parts during a manufacturing process. Conventional inspection systems use personnel to manually inspect parts as the parts move along a conveyor. Defective parts are removed from the conveyor. Such manual inspection systems are labor intensive and high cost. The manual inspection systems have low detection accuracy leading to poor product consistency. Additionally, manual inspection systems suffer from human error due to fatigue, such as missed defects, wrong counts, misplacing of parts, and the like.

Some known inspection systems use machine vision for inspecting parts. The machine vision inspection systems use cameras to image the parts. However, such inspection systems may have limited throughput as the parts typically need to be rotated or flipped over to view all sides of the parts. Such inspection systems typically lack flexibility as the machines have fixturing for the parts. The fixturing needs to be set up when changing between various parts, which is time consuming.

A need remains for a vision inspection system that may be operated in a cost effective and reliable manner.

BRIEF DESCRIPTION OF THE INVENTION

In one embodiment, a vision inspection system is provided including a rotary sorting platform being rotated about an axis and rotating parts from a first position to a second position. The vision inspection system includes an inspection station positioned adjacent the rotary sorting platform including imaging devices to image different sides of the parts. The vision inspection system includes a vision inspection controller receiving images from the imaging devices and processing the images from the imaging devices based on an image analysis model. The vision inspection controller processes the images to determine inspection results for each of the parts. The vision inspection controller has an artificial intelligence learning module operated to update the image analysis model based on the images received from the imaging devices.

In another embodiment, a vision inspection system is provided including a rotary sorting platform having a transparent plate being rotated about an axis for rotating parts from a first position to a second position. The vision inspection system includes an inspection station positioned adjacent the transparent plate. The inspection station includes imaging devices to image different sides of the parts including an upper imaging device, a lower imaging device, and a first side imaging device. The upper imaging device is located above the transparent plate for imaging top sides of the parts. The lower imaging device is located below the transparent plate for imaging bottom sides of the parts through the transparent plate. The first side imaging device is located adjacent the transparent plate generally coplanar with an upper surface of the transparent plate for imaging first sides of the parts. The vision inspection system includes a vision inspection controller receiving images from the imaging devices and processing the images from the imaging devices based on an image analysis model. The vision inspection controller processes the images to determine inspection results for each of the parts. The vision inspection controller has an artificial intelligence learning module operated to update the image analysis model based on the images received from the imaging devices.

In a further embodiment, a method of inspecting parts is provided including loading a first part of the parts on a rotary sorting platform, rotating the first part from a first position to a second position, imaging the first part at an inspection station positioned adjacent the rotary sorting platform using imaging devices to image different sides of the first part, receiving images from the imaging devices at a vision inspection controller, processing the images from the imaging devices at the vision inspection controller based on an image analysis model to determine inspection results for the first part, and customizing the image analysis model using an artificial intelligence learning module to update the image analysis model based on the images received from the imaging devices.

DETAILED DESCRIPTION OF THE INVENTION

Figure 1:
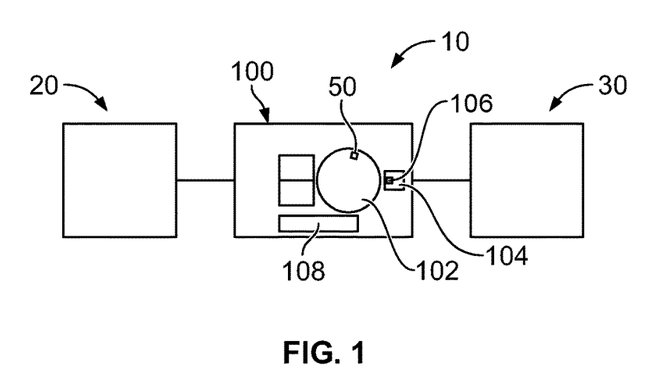
FIG. 1 illustrates a machine for manufacturing parts in accordance with an exemplary embodiment.

FIG. 1 illustrates a machine 10 for manufacturing parts 50, such as parts used in electrical connectors. For example, the parts 50 may be contacts, housings, or other types of parts. The machine 10 may be used for manufacturing parts used in other industries. The machine 10 includes one or more forming machines 20 used to form various parts 50.

For example, the forming machines 20 may include a molding machine, a press, a lathe, and the like. The machine 10 includes a vision inspection system 100 used to inspect the various parts 50. The machine 10 includes one or more packaging machines 30 used for packaging the various parts 50. In various embodiments, the parts 50 may be assembled prior to packaging, such as at an assembly station. The parts 50 are transported between the forming machines 20 and the vision inspection system 100. The vision inspection system 100 is used for quality inspection of the parts 50 and removes defective parts for scrap or further inspection. The acceptable parts 50 that have passed inspection by the vision inspection system 100 are transported between the vision inspection system 100 and the packaging machines 30.

The vision inspection system 100 includes a rotary sorting platform 102 that rotates the parts through the vision inspection system 100. The vision inspection system 100 includes an inspection station 104 having imaging devices 106 that image the parts 50 as the parts 50 are rotated by the rotary sorting platform 102. In an exemplary embodiment, the rotary sorting platform 102 is transparent to allow the imaging devices 106 to view all sides of the parts 50, including the bottom sides of the parts 50 through the transparent rotary sorting platform 102. The vision inspection system 100 includes a vision inspection controller 108 that receives the images from the imaging devices 106 and processes the images to determine inspection results. For example, the vision inspection controller 108 determines if each part 50 passes or fails inspection. The vision inspection controller 108 may reject parts 50 that are defective. In an exemplary embodiment, the vision inspection controller 108 includes an artificial intelligence (AI) learning module used to customize and configure image analysis based on the images received from the imaging devices 106. The vision inspection controller 108 may be updated and trained in real time during operation of the vision inspection system 100.

In an exemplary embodiment, the vision inspection system 100 may be used to inspect different types of parts 50. For example, the vision inspection system 100 may be used to inspect different sized parts, different shaped parts, and the like. In an exemplary embodiment, the use of the transparent rotary sorting platform 102 allows visibility of all sides of the parts 50 for imaging, which allows the parts 50 to be imaged quickly and efficiently. The parts 50 do not need to be rotated or turned to image various sides, such as the bottom side. As such, the parts 50 may simply rest on the upper surface of the rotary sorting platform 102 without the need for fixturing to the rotary sorting platform 102. The elimination of fixturing allows all sides of the parts 50 to be imaged.

Figure 2:
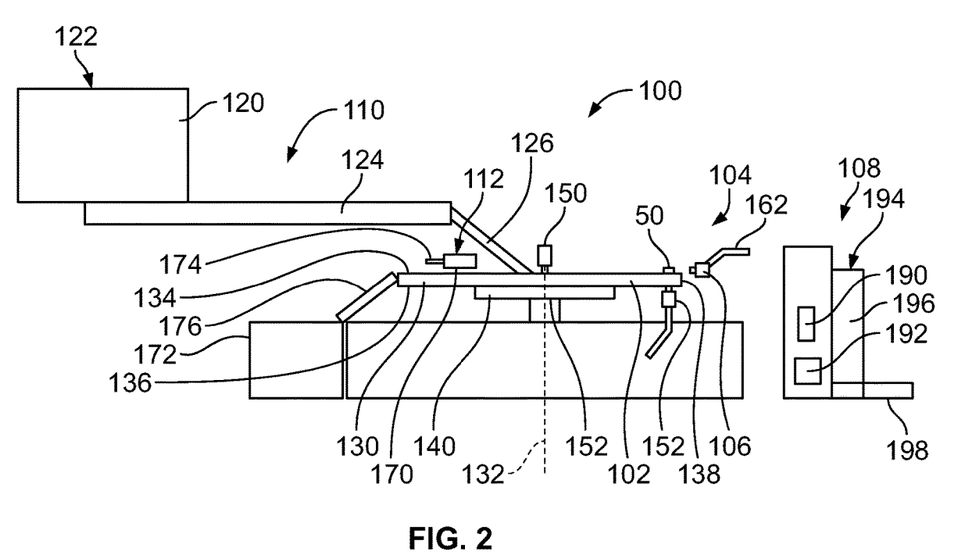
FIG. 2 is a side view of a vision inspection system of the machine in accordance with an exemplary embodiment.
Figure 3:
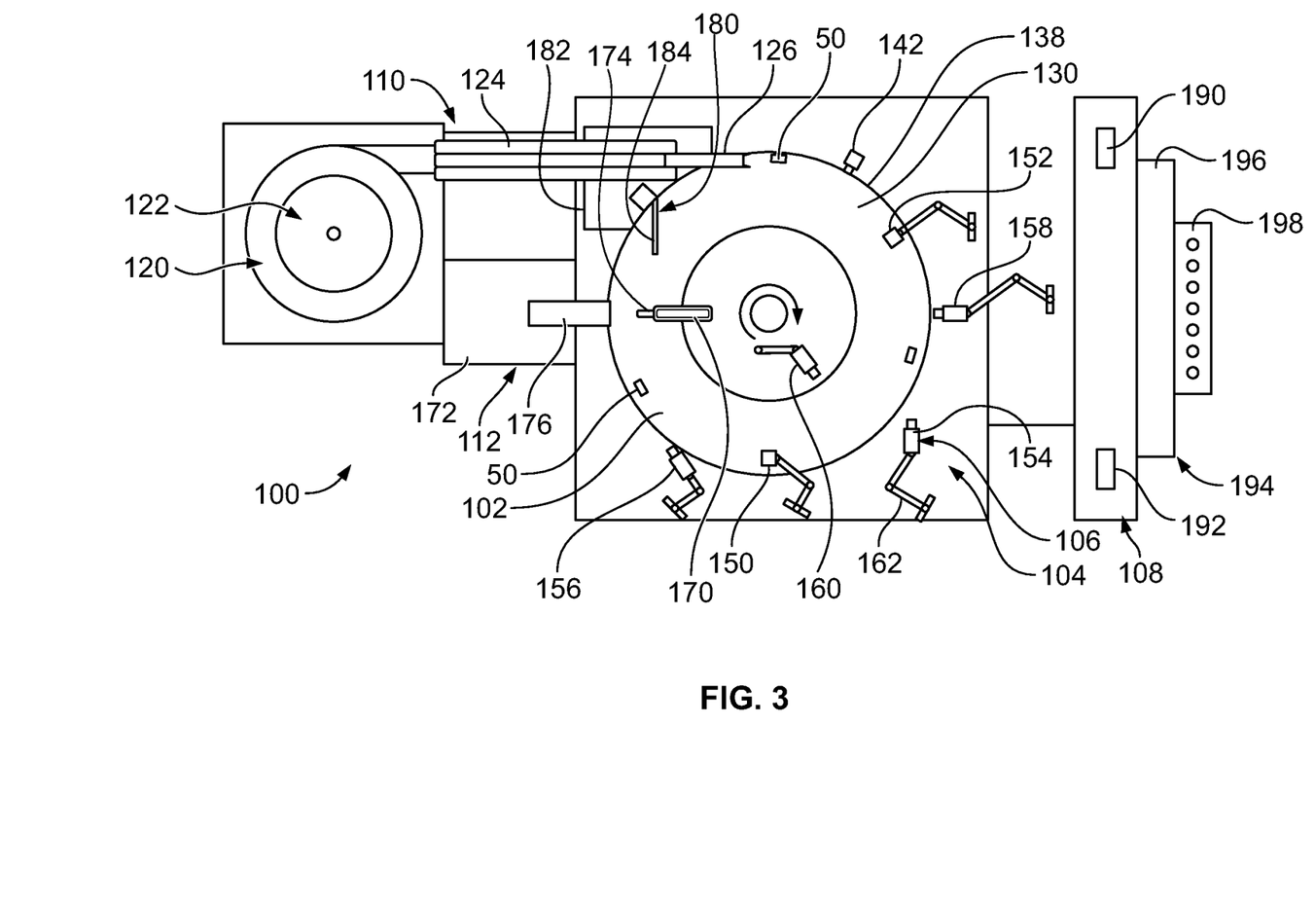
FIG. 3 is a top view of the vision inspection system in accordance with an exemplary embodiment.

FIG. 2 is a side view of the vision inspection system 100 in accordance with an exemplary embodiment. FIG. 3 is a top view of the vision inspection system 100 in accordance with an exemplary embodiment. The vision inspection system 100 includes the rotary sorting platform 102, the inspection station 104, and the vision inspection controller 108. In an exemplary embodiment, the vision inspection system 100 includes a part feeding device 110 and a part removal device 112. The parts 50 are loaded onto the rotary sorting platform 102 at a first position by the part feeding device 110. The parts 50 are rotated through the inspection station 104 to a second position by the rotary sorting platform 102. The parts 50 are removed from the rotary sorting platform 102 by the part removal device 112.

In an exemplary embodiment, the part feeding device 110 includes a bowl feeder 120 having a hopper 122 that receives the parts 50. The parts 50 are fed from the bowl feeder 120 to a conveyor 124. The conveyor 124 include a track 126 to guide the parts 50 from the bowl feeder 120 to the rotary sorting platform 102. The parts 50 are fed to the first position on the rotary sorting platform 102. Other types of part feeding devices 110 may be provided in alternative embodiments.

The rotary sorting platform 102 includes a transparent plate 130 that is rotated about an axis 132. The plate 130 includes an upper surface 134 and a lower surface 136. The plate 130 extends to an outer edge 138. In various embodiments, the plate 130 is circular. However, the plate 130 may have other shapes in alternative embodiments. The plate 130 may include a central opening (for example, the plate 130 may be ring shaped). In various embodiments, the plate 130 is a glass plate. In an exemplary embodiment, the part feeding device 110 position the parts 50 proximate to the outer edge 138. However, the part feeding device 110 may position the parts 50 remote from the outer edge 138. In various embodiments, the plate 130 is mounted to a disk 140 that is used to rotate the plate 130. The speed and/or direction of rotation of the plate 130 may be controlled.

In an exemplary embodiment, the vision inspection system 100 includes a triggering sensor 142 positioned adjacent the rotary sorting platform 102. The triggering sensor 142 is located upstream of the inspection station 104. The triggering sensor 142 is located downstream of the part feeding device 110. The triggering sensor 142 triggers operation of the imaging devices 106 by sensing the parts 50 passing the triggering sensor 142. The triggering sensor 142 may be a proximity sensor in various embodiments. The triggering sensor 142 senses whenever one of the parts 50 passes the triggering sensor 142. Operation of the imaging devices 106 for imaging the parts 50 may be based on the distance of the various imaging devices 106 from the triggering sensor 142 as well as the rotation speed of the rotary sorting platform 102. For example, rotary distances from the triggering sensor 142 to the imaging devices 106 may be used for timing operation of the imaging devices 106. In various embodiments, the triggering sensor 142 may detect the location of the parts 50 relative to the outer edge 138 of the plate 130 to control operation of the imaging devices 106. For example, the part distance from the triggering sensor 142 may affect a location of focusing of the imaging device 106 for imaging the part 50.

The inspection station 104 includes the imaging devices 106 arranged in various locations around the rotary sorting platform 102. The imaging devices 106 are used to image all sides of each of the parts 50, such as the top side, the bottom side, the front side, the rear side, and the opposite first and second sides extending between the front side and a rear side. To accomplish such imaging of the parts 50, the imaging devices 106 include multiple imaging devices 106 arranged around the rotary sorting platform 102 to image the parts 50 from different angles. The imaging devices 106 may be cameras. The cameras may be visible light cameras. Other types of cameras may be used in alternative embodiments, such as an infrared camera. In an exemplary embodiment, the location of the part 50 relative to the rotary sorting platform 102 and the orientation of the part 50 relative to the rotary sorting platform 102 is controlled by the part feeding device 110. For example, the part 50 may be positioned on the rotary sorting platform 102 proximate to the outer edge 138 such that the first side of the part 50 is oriented generally parallel to the outer edge 138 (for example, parallel to the tangent of the outer edge 138).

In an exemplary embodiment, the inspection station 104 includes an upper imaging device 150, a lower imaging device 152, a front side imaging device 154, a rear side imaging device 156, a first side imaging device 158, and a second side imaging device 160. The upper imaging device 150 is located above the plate 130 for imaging a top side of the part 50. The upper imaging device 150 is directed toward the part 50 to image in a downward direction. The lower imaging device 152 is located below the plate 130 for imaging a bottom side of the part 50. The lower imaging device 152 is directed toward the part 50 to image in an upward direction. The front side imaging device 154 is located adjacent the plate 130 generally coplanar with the upper surface 134 of the plate 130 for imaging a front side of the part 50. The rear side imaging device 156 is located adjacent the plate 130 generally coplanar with the upper surface 134 of the plate 130 for imaging a rear side of the part 50. The first side imaging device 158 is located adjacent the plate 130 generally coplanar with the upper surface 134 of the plate 130 for imaging a first side of the part 50. The first side imaging device 158 is located outward of the outer edge 138 of the plate 130. The second side imaging device 160 is located adjacent the plate 130 generally coplanar with the upper surface 134 of the plate 130 for imaging a second side of the part 50.

In an exemplary embodiment, each imaging device 106 is mounted to a position manipulator 162 for moving the imaging device 106 relative to the rotary sorting platform 102. The position manipulator 162 may be an arm or a bracket that supports the imaging device 106. In various embodiments, the position manipulator 162 may be positionable in multiple directions, such as in two-dimensional or three-dimensional space. The position manipulator 162 may be automatically adjusted, such as by a controller that controls positioning of the position manipulators 162. The position manipulator 162 may be adjusted by another control module, such as an AI control module. In other various embodiments, the position manipulator 162 may be manually adjusted. The position manipulators 162 may be mounted to the frame of the machine 10, such as from below the platform 102, above the platform 102, at locations outside of the platform 102 or from inside the opening in the platform 102, when present. The position manipulators 162 may be supported by other structures around the machine 10. The positions of the imaging devices 106 may be adjusted based on the location of the parts 50 on the rotary sorting platform 102 (for example, based on a distance from the outer edge 138 of the plate 130). The positions of the imaging devices 106 may be adjusted based on the types of parts 50 being imaged. For example, when a different type of part 50 is being imaged, the imaging devices 106 may be moved based on the type of part being imaged.

The part removal device 112 is located downstream of the inspection station 104 and positioned above the platform 102 to interact with the parts 50. The part removal device 112 may be supported from above the platform 102 or supported by a support structure located outside of the platform 102. In other embodiments, the part removal device 112 may be supported from inside the central opening in the platform 102, when present. The part removal device 112 may be used to separate acceptable parts from defective parts based on input from the imaging device 106. The part removal device 112 includes a pass ejector 170 operated to eject the acceptable parts 50 from the rotary sorting platform 102. The part removal device 112 includes a pass collection bin 172 that receives the acceptable parts 50. The pass ejector 170 ejects the acceptable parts 50 from the rotary sorting platform 102 into the collection bin 172 based on inspection results. In an exemplary embodiment, the pass ejector 170 includes a movable pusher 174 that is actuated to push the parts 50 off of the rotary sorting platform 102 into the pass collection bin 172. Optionally, a chute 176 guides the part 50 into the pass collection bin 172. Other types of ejectors may be used in alternative embodiments.

In an exemplary embodiment, the part removal device 112 includes a reject ejector 180 operated to eject the defective parts 50 from the rotary sorting platform 102. The part removal device 112 includes a reject collection bin 182 that receives the defective parts 50. The reject ejector 180 ejects the defective parts 50 from the rotary sorting platform 102 into the collection bin 182 based on inspection results. In an exemplary embodiment, the reject ejector 180 includes a catch wall 184 extending over the plate 130 that catches the parts 50 that pass the ejector 170. The catch wall 184 forces the parts into the collection bin 182. Other types of ejectors may be used in alternative embodiments.

The vision inspection controller 108 is operably coupled to the imaging devices 106 and the part removal device 112 for controlling operation of the part removal device 112. The vision inspection controller 108 may be operably coupled to the part feeding device 110 for controlling operation of the part feeding device 110. The vision inspection controller 108 is operably coupled to the triggering sensor 142 to receive inputs from the triggering sensor 142. The vision inspection controller 108 may control operation of the imaging devices 106 based on the input from the triggering sensor 142. The imaging devices 106 communicate with the vision inspection controller 108 through machine vision software to process the data, analyze results, record findings, and make decisions based on the information. The vision inspection controller 108 provides consistent and efficient inspection automation.

The vision inspection controller 108 receives the images from the imaging devices 106 and processes the images to determine inspection results. In an exemplary embodiment, the vision inspection controller 108 includes one or more processors 190 for processing the images. The vision inspection controller 108 determines if each part 50 passes or fails inspection. The vision inspection controller 108 controls the pass ejector 170 to eject the acceptable parts 50 that pass inspection into the pass collection bin 172. Defective parts 50 that fail inspection or rotated beyond the pass ejector 170 to the reject ejector 180. The reject ejector 180 loads the defective parts 50 into the reject collection bin 182.

In an exemplary embodiment, the vision inspection controller 108 receives images of all sides of the part 50 as the part 50 is rotated through the inspection station 104. For example, the vision inspection controller 108 receives images of the top side of the part 50 from the upper imaging device 150, images of the bottom side of the part 50 from the lower imaging device 152, images of the front side of the part 50 from the front side imaging device 154, images of the rear side of the part 50 from the rear side imaging device 156, images of the first side of the part 50 from the first side imaging device 158, and images of the second side of the part 50 from the second side imaging device 160. Once the images are received, the images are processed based on an image analysis model. For example, the images may be compared to the image analysis model to determine if the part 50 has any defects. The image analysis model may be a three-dimensional model defining a baseline structure of the part being imaged. In other various embodiments, the image analysis model may be a series of two-dimensional models, such as for each imaging device 106. The image analysis model may be based on images of known or quality passed parts, such as during a learning or training process.

The image analysis model may be based on the design specifications of the part 50. For example, the image analysis model may include design parameters for edges, surfaces, and features of the part. The image analysis model may include tolerance factors for the parameters, allowing offsets within the tolerance factors. During processing, the images may be individually processed or may be combined into a digital model of the part, which is then compared to the image analysis model. The images are processed based on the image analysis model to detect defects, such as short shot defects, flash defects, black dots, dirt, dents, scratches, or other types of defects. The images may be processed by performing pattern recognition of the images based on the image analysis model. The images may be processed by performing feature extraction of boundaries and surfaces detected in the images and comparing the boundaries and surfaces to the image analysis model. The vision inspection controller 108 may identify lines, edges, bridges, grooves, or other boundaries or surfaces within the image. The vision inspection controller 108 may perform contrast enhancement and or noise reduction of the images during processing. The vision inspection controller 108 may identify areas of interest within the image for enhanced processing. The vision inspection controller 108 may perform image segmentation during processing.

In various embodiments, if the imaging of the parts 50 is insufficient, such as unclear images, poor image contrast, incorrect imaging angles, and the like, the parts 50 may be reimaged rather than being discarded. For example, the part removal device 112, such as reject ejector 180, may be moved and/or allow the part 50 to continue around to be imaged a second time. In other embodiments, the platform 102 may be rotated in a reverse direction to align the part with one or more of the imaging devices 106 to have the part 50 reimaged. The imaging devices 106 may be manipulated for the second imaging, such as by moving the imaging device 106 or changing the focus or lighting of the imaging device 106.

In an exemplary embodiment, the vision inspection controller 108 includes an artificial intelligence (AI) learning module 192. The AI learning module 192 uses artificial intelligence to train the vision inspection controller 108 and improve inspection accuracy of the vision inspection controller 108. The AI learning module 192 update the image analysis model based on the images received from the imaging devices 106. For example, the image analysis model may be customized and configured by the AI learning module 192. The images forming the basis of the image analysis model may be revised or updated based on images taken by the imaging devices 106, using the AI learning module 192. For example, the image analysis model may be based on multiple images, which are updated or expanded based on images from the AI learning module 192. As the AI learning module expands the image analysis model, the quality of the image processing may be improved. The vision inspection controller 108 is updated and trained in real time during operation of the vision inspection system 100. The AI learning module 192 of the vision inspection controller 108 may be operable in a learning mode to train the vision inspection controller 108 and develop the image analysis model. The image analysis model changes over time based on input from the AI learning module 192 (for example, based on images of the parts 50 taken by the imaging devices 106). In alternative embodiments, the AI learning module 192 may be a separate module from the vision inspection controller 108 independently operable from the vision inspection controller 108. For example, the AI learning module 192 may be separately coupled to the imaging devices 106 or other components of the machine 10.

In an exemplary embodiment, the vision inspection controller 108 includes a user interface 194. The user interface 194 includes a display 196, such as a monitor. The user interface 194 includes one or more inputs 198, such as a keyboard, a mouse, buttons, and the like. An operator is able to interact with the vision inspection controller 108 with the user interface 194.

Figure 4:
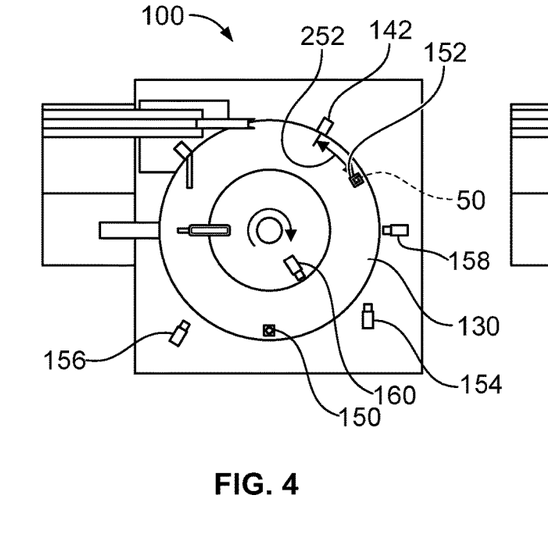
FIG. 4 is a top view of the vision inspection system in accordance with an exemplary embodiment showing the part aligned with a lower imaging device.

FIG. 4 is a top view of the vision inspection system 100 in accordance with an exemplary embodiment showing the part 50 aligned with the lower imaging device 152. The lower imaging device 152 images the part 50 through the transparent plate 130. The lower imaging device 152 is located a rotary distance 252 from the triggering sensor 142. The timing of imaging by the lower imaging device 152 is based on the rotary distance 252.

Figure 5:
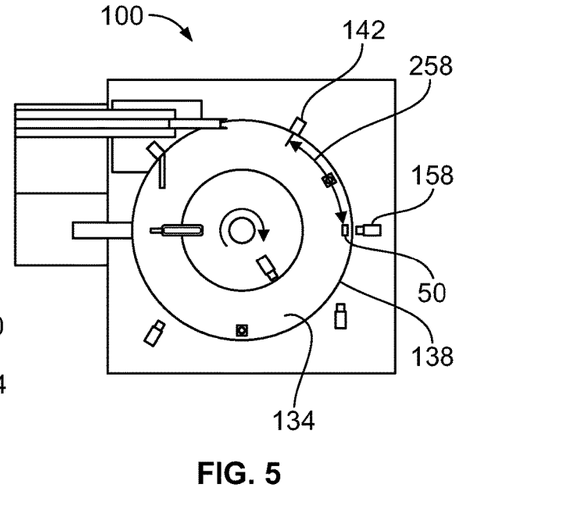
FIG. 5 is a top view of the vision inspection system in accordance with an exemplary embodiment showing the part aligned with a first side imaging device.

FIG. 5 is a top view of the vision inspection system 100 in accordance with an exemplary embodiment showing the part 50 aligned with the first side imaging device 158. The first side imaging device 158 is located adjacent to the outer edge 138 coplanar with the upper surface 134 to image the part 50. The first side imaging device 158 is located a rotary distance 258 from the triggering sensor 142. The timing of imaging by the first side imaging device 158 is based on the rotary distance 258.

Figure 6:
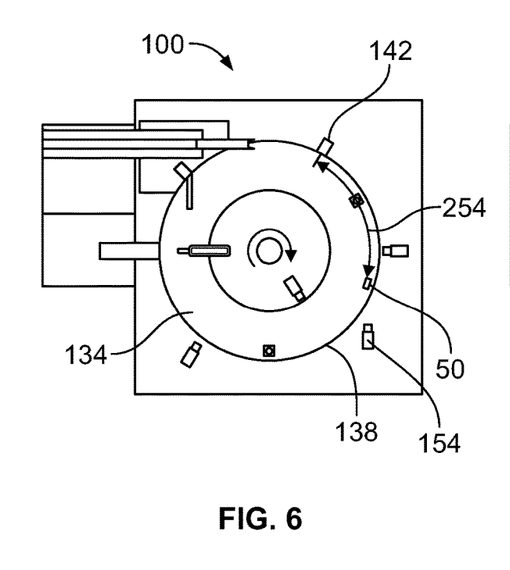
FIG. 6 is a top view of the vision inspection system in accordance with an exemplary embodiment showing the part aligned with a front side imaging device.

FIG. 6 is a top view of the vision inspection system 100 in accordance with an exemplary embodiment showing the part 50 aligned with the front side imaging device 154. The front side imaging device 154 is located adjacent to the outer edge 138 coplanar with the upper surface 134 to image the part 50. The front side imaging device 154 is located a rotary distance 254 from the triggering sensor 142. The timing of imaging by the front side imaging device 154 is based on the rotary distance 254.

Figure 7:
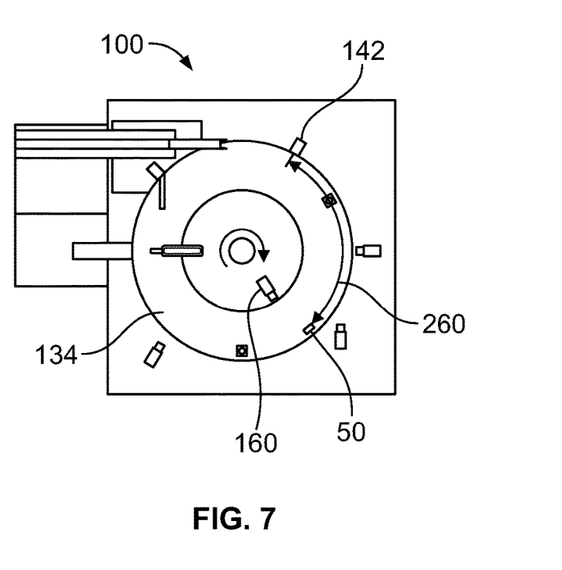
FIG. 7 is a top view of the vision inspection system in accordance with an exemplary embodiment showing the part aligned with a second side imaging device.

FIG. 7 is a top view of the vision inspection system 100 in accordance with an exemplary embodiment showing the part 50 aligned with the second side imaging device 160. The second side imaging device 160 is located radially inside of the part 50, coplanar with the upper surface 134, to image the part 50. The second side imaging device 160 is located a rotary distance 260 from the triggering sensor 142. The timing of imaging by the second side imaging device 160 is based on the rotary distance 260.

Figure 8:
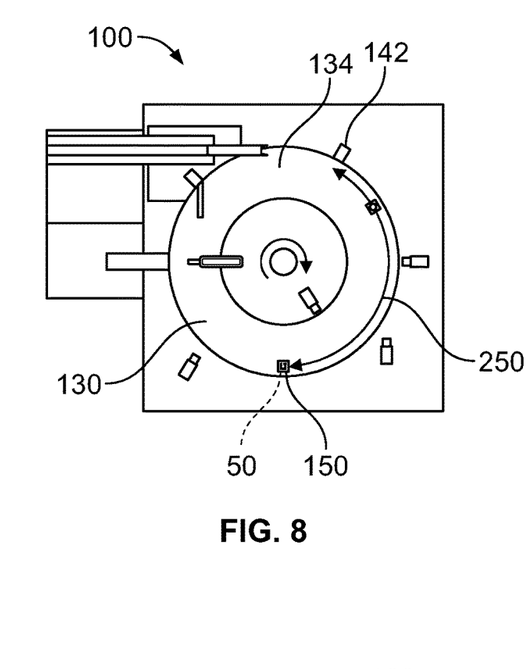
FIG. 8 is a top view of the vision inspection system in accordance with an exemplary embodiment showing the part aligned with a upper imaging device.

FIG. 8 is a top view of the vision inspection system 100 in accordance with an exemplary embodiment showing the part 50 aligned with the upper imaging device 150. The upper imaging device 150 images the part 50 from above the transparent plate 130. The upper imaging device 150 is located a rotary distance 250 from the triggering sensor 142. The timing of imaging by the upper imaging device 150 is based on the rotary distance 250.

Figure 9:
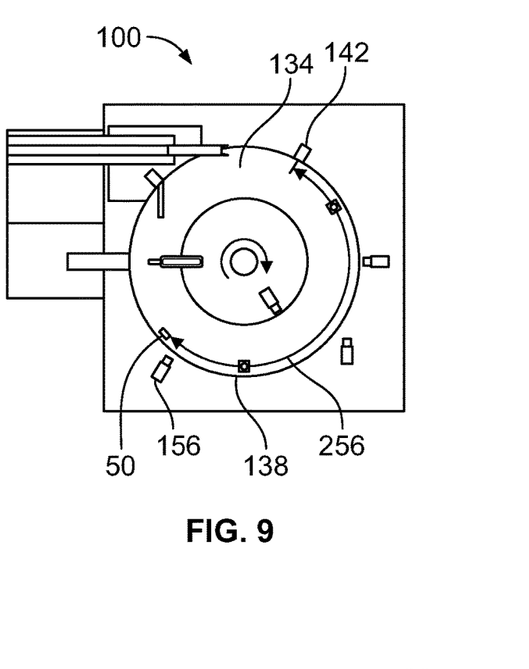
FIG. 9 is a top view of the vision inspection system in accordance with an exemplary embodiment showing the part aligned with a rear side imaging device.

FIG. 9 is a top view of the vision inspection system 100 in accordance with an exemplary embodiment showing the part 50 aligned with the rear side imaging device 156. The rear side imaging device 156 is located adjacent to the outer edge 138 coplanar with the upper surface 134 to image the part 50. The rear side imaging device 156 is located a rotary distance 256 from the triggering sensor 142. The timing of imaging by the rear side imaging device 156 is based on the rotary distance 256.

Figure 10:
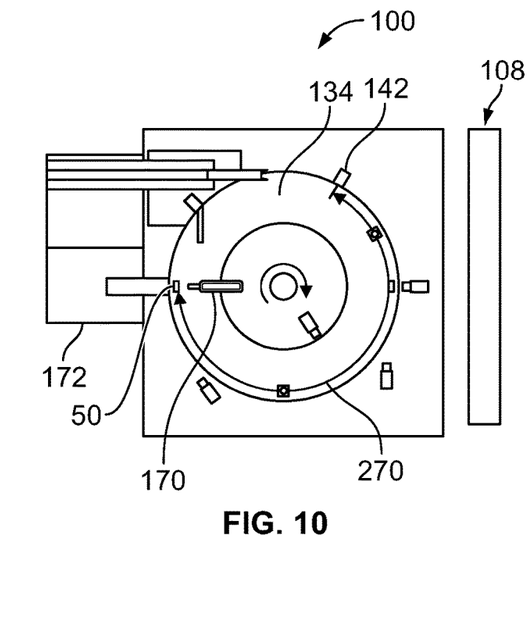
FIG. 10 is a top view of the vision inspection system in accordance with an exemplary embodiment showing the part aligned with a pass ejector.

FIG. 10 is a top view of the vision inspection system 100 in accordance with an exemplary embodiment showing the part 50 aligned with the pass ejector 170. The pass ejector 170 is located radially inside of the part 50, coplanar with the upper surface 134, to press the part 50 radially outward into the collection bin 172. The pass ejector 170 is controlled based on the inspection results from the vision inspection controller 108. The pass ejector 170 is located a rotary distance 270 from the triggering sensor 142. The timing of actuating the pass ejector 170 is based on the rotary distance 270.

Figure 11:
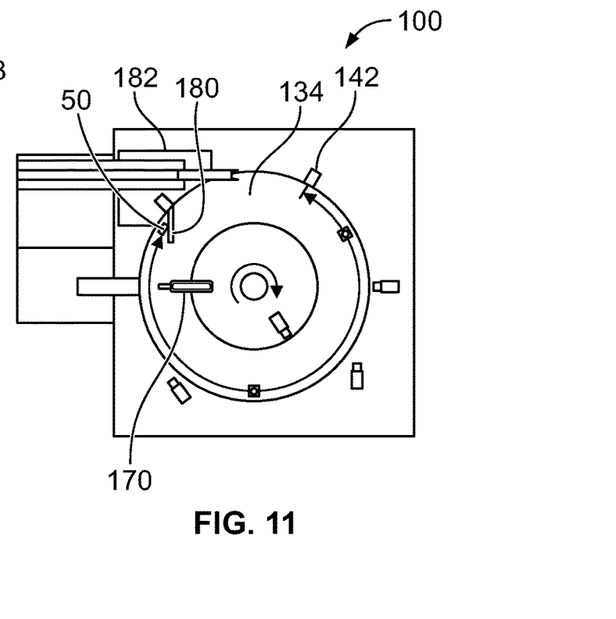
FIG. 11 is a top view of the vision inspection system in accordance with an exemplary embodiment showing the part aligned with the reject ejector.

FIG. 11 is a top view of the vision inspection system 100 in accordance with an exemplary embodiment showing the part 50 aligned with the reject ejector 180. The reject ejector 180 is located along the upper surface 134 to catch the part 50 as the part 50 is rotated to the reject ejector 180. All parts that are rotated past the pass ejector 170 are caught by the reject ejector 180 and guided into the collection bin 182.

Figure 12:
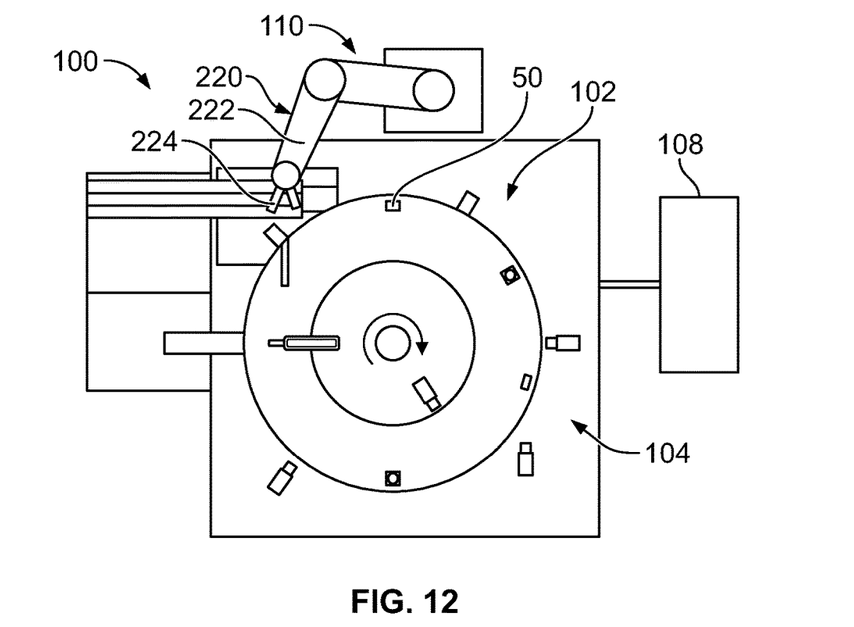
FIG. 12 is a top view of the vision inspection system in accordance with an exemplary embodiment.

FIG. 12 is a top view of the vision inspection system 100 in accordance with an exemplary embodiment. The vision inspection system 100 includes the rotary sorting platform 102, the inspection station 104, and the vision inspection controller 108. The part feeding device 110 of the vision inspection system 100 includes a part manipulator 220 rather than the bowl feeder 120 (shown in FIG. 2). The part manipulator 220 includes a robot arm 222 and a gripper 224 at an end of the robot arm 222. In various embodiments, the robot arm 222 is a four-axis robot arm or a six-axis robot arm. Other types of robot arms 222 may be used in alternative embodiments. The parts 50 are moved from a conveyor, a track or a bin onto the rotary sorting platform 102.

Figure 13:
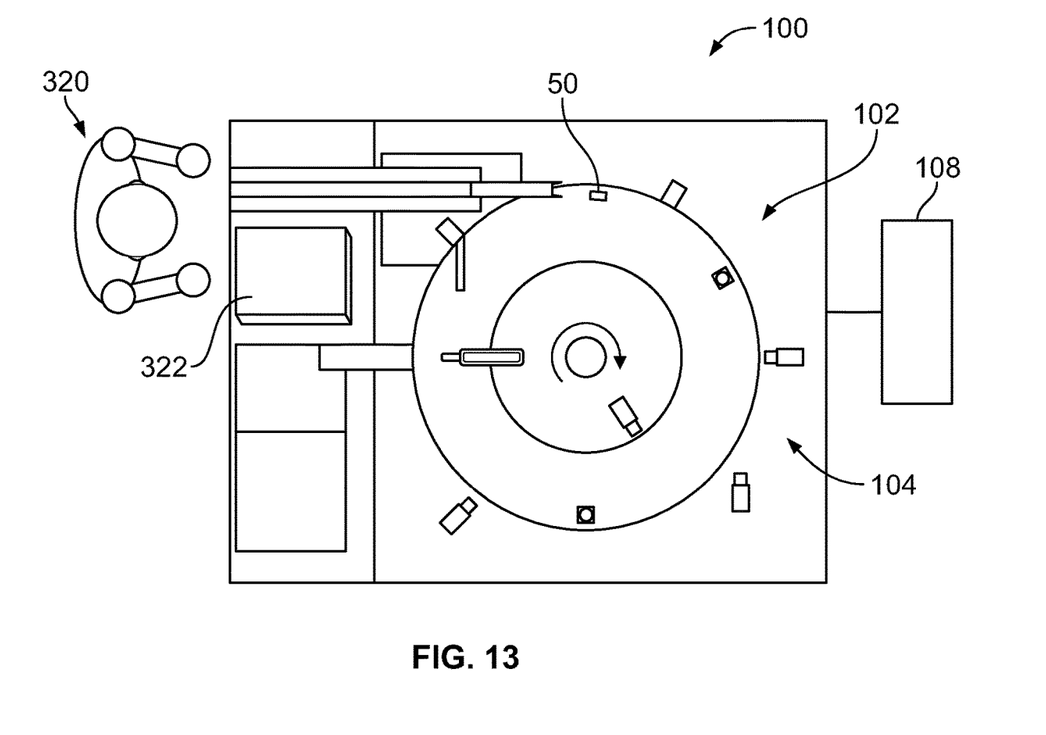
FIG. 13 is a top view of the vision inspection system in accordance with an exemplary embodiment.

FIG. 13 is a top view of the vision inspection system 100 in accordance with an exemplary embodiment. The vision inspection system 100 includes the rotary sorting platform 102, the inspection station 104, and the vision inspection controller 108. The part feeding device 110 of the vision inspection system 100 includes a manual feeding station 320 rather than the bowl feeder 120 (shown in FIG. 2). An operator manually loads the parts 50 onto a conveyor, such as from a load bin 322.

Figure 14:
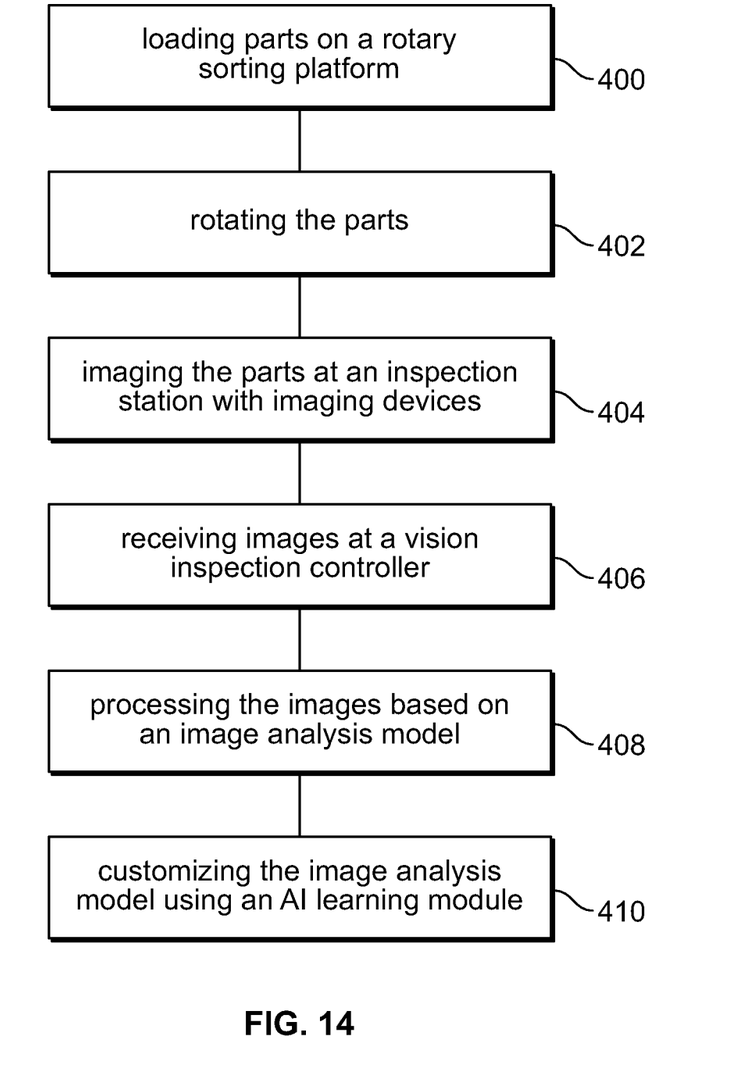
FIG. 14 is a flow chart showing a method of inspecting parts using a vision inspection system in accordance with an exemplary embodiment.

FIG. 14 is a flow chart showing a method of inspecting parts in accordance with an exemplary embodiment. The method, at 400, includes loading the parts 50 on the rotary sorting platform 102. The parts 50 may be loaded manually or automatically. The parts 50 are loaded periodically, such as at approximately 200 parts per minute. The parts 50 may be loaded onto the rotary sorting platform 102 at predetermined orientations. Alternatively, the parts 50 may be loaded randomly onto the rotary sorting platform 102.

At 402, the method includes rotating the parts from a first position to a second position. The parts 50 are rotated by the rotary sorting platform 102. In an exemplary embodiment, the parts 50 are rotated on the transparent plate 130.

At 404, the method includes imaging the parts at the inspection station 104 positioned adjacent the rotary sorting platform 102 using the imaging devices 106 to image different sides of the parts 50. The imaging devices 106 are used to image all of the sides of each part 50. In an exemplary embodiment, one of the imaging devices 106 are provided below the transparent plate 130 to view the bottom side of the parts 50 through the transparent plate 130. As such, all sides of the parts 50, including the bottom sides, may be viewed without needing to flip or rotate the parts 50. The imaging may be performed quickly and efficiently using the transparent plate 130.

At 406, the method includes receiving the images from the imaging devices 106 at the vision inspection controller 108. At 408, the method includes processing the images from the imaging devices 106 at the vision inspection controller 108 based on an image analysis model to determine inspection results for the parts. In various embodiments, the images are processed by comparing the image to the image analysis model to determine if the part 50 has any defects. In various embodiments, the images are processed by performing pattern recognition of the images based on the image analysis model. In various embodiments, the images are processed by performing feature extraction of boundaries and surfaces detected in the images and comparing the boundaries and surfaces to the image analysis model.

At 410, the method includes customizing the image analysis model using the artificial intelligence learning module 192 to update the image analysis model based on the images received from the imaging devices 106. The image analysis model is updated based on the images from the imaging devices 106. The images forming the basis of the image analysis model may be revised or updated based on images taken by the imaging devices 106, using the AI learning module 192. For example, the image analysis model may be based on multiple images, which are updated or expanded based on images from the AI learning module 192. As the AI learning module expands the image analysis model, the quality of the image processing may be improved.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A vision inspection system comprising:
a rotary sorting platform being rotated about an axis, the rotary sorting platform rotating parts from a first position to a second position;
an inspection station positioned adjacent to the rotary sorting platform, the inspection station including imaging devices to image different sides of the parts, the imaging devices imaging the different sides of the parts at different times and at different rotary distances from the first position; and
a vision inspection controller receiving images from the imaging devices and processing the images from the imaging devices based on an image analysis model, the vision inspection controller processing the images to determine inspection results for each of the parts, the vision inspection controller having an artificial intelligence learning module operated to update and expand the image analysis model in real time based on the images of the different sides of the parts received from the imaging devices such that the image analysis model is configured to learn from the images of the imaging devices.

2. The vision inspection system of claim 1, wherein the image analysis model changes over time based on input from the artificial intelligence learning module.

3. The vision inspection system of claim 1, wherein the artificial intelligence learning module is operable in a learning mode to train the vision inspection controller and develop the image analysis model.

4. The vision inspection system of claim 1, wherein the rotary sorting platform includes a glass plate being transparent, at least one of the imaging devices imaging the parts through the transparent glass plate.

5. The vision inspection system of claim 1, wherein the inspection results include a pass result if the processed image is acceptable based on the image analysis model and the inspection results include a reject result if the processed image is defective based on the image analysis model.

6. The vision inspection system of claim 1, wherein the vision inspection controller processes the images by performing pattern recognition based on the image analysis model.

7. The vision inspection system of claim 1, wherein the vision inspection controller processes the images by performing feature extraction of boundaries and surfaces in the images and comparing the boundaries and surfaces to the image analysis model.

8. The vision inspection system of claim 7, wherein the artificial intelligence learning module updates the image analysis model based on the boundaries and surfaces extracted from the images.

9. The vision inspection system of claim 1, further comprising a triggering sensor positioned adjacent to the rotary sorting platform upstream of the inspection station, the triggering sensor triggering operation of the imaging devices based on the triggering sensor sensing the parts.

10. The vision inspection system of claim 1, further comprising an ejector and a collection bin, the ejector being operated to eject the parts from the rotary sorting platform into the collection bin based on the inspection results.

11. A vision inspection system comprising:
a rotary sorting platform having a transparent plate being rotated about an axis, the rotary sorting platform rotating parts from a first position to a second position;
an inspection station positioned adjacent to the transparent plate, the inspection station including imaging devices to image different sides of the parts including an upper imaging device, a lower imaging device, and a first side imaging device, the upper imaging device located above the transparent plate for imaging top sides of the parts, the lower imaging device located below the transparent plate for imaging bottom sides of the parts through the transparent plate, the first side imaging device located adjacent to the transparent plate generally coplanar with an upper surface of the transparent plate for imaging first sides of the parts;
a vision inspection controller receiving images from the imaging devices and processing the images from the imaging devices based on an image analysis model, the vision inspection controller processing the images to determine inspection results for each of the parts, the vision inspection controller having an artificial intelligence learning module operated to update the image analysis model based on the images received from the imaging devices; and
a triggering sensor positioned adjacent to the rotary sorting platform upstream of the inspection station, the triggering sensor triggering operation of the imaging devices based on the triggering sensor sensing the parts, wherein the upper imaging device is located at a first rotary distance from the triggering sensor, the lower imaging device being located at a second rotary distance from the triggering sensor, and the first side imaging device being located at a third rotary distance from the triggering sensor, timing of imaging of the upper imaging device being based on the first rotary distance, timing of imaging of the lower imaging device being based on the second rotary distance, and timing of imaging of the first side imaging device being based on the third rotary distance.

12. The vision inspection system of claim 11, wherein the image analysis model changes over time based on input from the artificial intelligence learning module.

13. The vision inspection system of claim 11, wherein the artificial intelligence learning module is operable in a learning mode to train the vision inspection controller and develop the image analysis model.

14. The vision inspection system of claim 11, wherein the vision inspection controller processes the images by performing feature extraction of boundaries and surfaces in the images and comparing the boundaries and surfaces to the image analysis model.

15. The vision inspection system of claim 14, wherein the artificial intelligence learning module updates the image analysis model based on the boundaries and surfaces extracted from the images.

16. The vision inspection system of claim 11, wherein the inspection station further includes a second side imaging device located adjacent to the transparent plate generally coplanar with the upper surface of the transparent plate for imaging second sides of the parts opposite the first sides of the parts.

17. The vision inspection system of claim 16, wherein the inspection station further includes a front side imaging device and a rear side imaging device, the front side imaging device located adjacent to the transparent plate generally coplanar with the upper surface of the transparent plate for imaging front side of the parts, the rear side imaging device located adjacent to the transparent plate generally coplanar with the upper surface of the transparent plate for imaging rear sides of the parts.

18. A method of inspecting parts comprising:
loading a first part of the parts on a rotary sorting platform;
rotating the first part from a first position to a second position;
imaging the first part at an inspection station positioned adjacent to the rotary sorting platform using imaging devices to image different sides of the first part, wherein the imaging devices image the different sides of the parts at different times and at different rotary distances from the first position;
receiving images from the imaging devices at a vision inspection controller;
processing the images from the imaging devices at the vision inspection controller based on an image analysis model to determine inspection results for the first part; and customizing the image analysis model using an artificial intelligence learning module to update and expand the image analysis model in real time based on the images of the different sides of the parts received from the imaging devices to train the image analysis model.

19. The vision inspection system of claim 1, further comprising a triggering sensor positioned adjacent to the rotary sorting platform upstream of the inspection station, the triggering sensor triggering operation of the imaging devices based on the triggering sensor sensing the parts, wherein timing of imaging of the imaging devices is based on the rotary distances of the imaging devices from the triggering sensor.

* * * * *